United States Patent [19]

Yata et al.

[11] Patent Number: 5,550,169
[45] Date of Patent: Aug. 27, 1996

[54] PREPARATION OF WATER-IMPERMEABLE POLYURETHANE FOAM

[75] Inventors: Tatsuo Yata; Hideya Kinoshita, both of Yokohama, Japan

[73] Assignee: Bridgestone Corporation, Tokyo, Japan

[21] Appl. No.: 293,220

[22] Filed: Aug. 19, 1994

[30] Foreign Application Priority Data

Aug. 20, 1993 [JP] Japan ................................. 5-226696

[51] Int. Cl.$^6$ ............................................. C08G 18/32
[52] U.S. Cl. ........................... 521/112; 521/170; 521/172
[58] Field of Search ............................ 521/112, 170, 521/172

[56] References Cited

U.S. PATENT DOCUMENTS

| | | |
|---|---|---|
| 4,279,757 | 7/1981 | DeBeuckelaer et al. . |
| 4,454,253 | 6/1984 | Murphy et al. . |

FOREIGN PATENT DOCUMENTS

| | | |
|---|---|---|
| 0047081 | 3/1982 | European Pat. Off. . |
| 0013412 | 12/1979 | Germany . |
| 57-102978 | 6/1982 | Japan . |
| 60-245623 | 12/1985 | Japan . |
| 63-27583 | 2/1988 | Japan . |
| 1-38152 | 8/1989 | Japan . |
| 2-55470 | 11/1990 | Japan . |
| 2-298574 | 12/1990 | Japan . |
| 1318855 | 5/1973 | United Kingdom . |

*Primary Examiner*—Morton Foelak
*Attorney, Agent, or Firm*—Sughrue, Mion, Zinn, Macpeak & Seas

[57] ABSTRACT

A flexible or semi-hard polyurethane foam is prepared from a blend containing a polyhydroxyl compound, an isocyanate, a blowing agent, a catalyst, and a foam stabilizer. A polyolefin polyol is used as the polyhydroxyl compound. A carboxy, epoxy or methacryl-modified organosilicone is used as the foam stabilizer. The resulting polyurethane foam is impermeable to water.

2 Claims, 2 Drawing Sheets

PREPARATION OF WATER-IMPERMEABLE POLYURETHANE FOAM

BACKGROUND OF THE INVENTION

1. Field of the Invention

This invention relates to a method for preparing a water-impermeable, flexible or semi-hard, open cell polyurethane foam.

2. Prior Art

Several methods are known in the art for the preparation of low air-permeable, water-impermeable, flexible or semi-hard, open cell polyurethane foams. For example, (1) a flexible or semi-hard, open cell polyurethane foam is impregnated with a volatile solution of asphalt followed by drying. (2) A sealing material in the form of a flexible or semi-hard, open cell polyurethane foam is prepared by combining at least one of a polydienic polyol, a dimer acid polyol, and a polyol having more than 90 mol % of an alkylene oxide addition polymerized thereto with a hydroxyl-containing organosilicone as disclosed in Japanese Patent Publication (JP-B) No. 55470/1990. (3) Japanese Patent Application Kokai (JP-A) No. 27583/1988 discloses a method for preparing a sealing material in the form of a polyurethane foam having a polyolefin skeleton as a polyol. (4) JP-A 298574/1990 discloses a method for preparing sealing material in the form of a saturated hydrocarbon resin skeleton polyurethane foam using a hydroxyl-containing reactive silicone.

These methods have the following drawbacks. Method (1) suffers from the problems of environmental pollution by the solvent given off during the drying step, foam productivity, and collapse of once expanded cells. Method (2) has no outer appearance problem if the foam density is as high as 40 kg/m$^3$, but in a low density region, suffers from the occurrence of void-like pinholes or cracks within the foam. Methods (3) and (4) are not economical.

Often, conventional flexible or semi-hard, open cell polyurethane foams are generally prepared by using a polyether or polymeric polyol mainly containing a propylene oxide with a molecular weight of 450 to 8,000, tolylene diisocyanate, a blowing agent, and a foam stabilizer. Depending on particular types of polyol and amine catalyst as well as their amounts, low air-permeable foams can be prepared in a relatively simple manner. However, it is not expectable that the resulting foams are also impermeable to water.

JP-A 245623/1985 discloses a flexible polyurethane foam having low air permeability which is prepared from a blend containing a polyether polyol and a carboxyl-modified organosilicone. This foam is less impermeable to water. Furthermore, JP-A 38152/1989 discloses to use as the foam stabilizer an organosilicone compound which is based on a polydialkylsiloxane having a primary or secondary amino group. This foam is also less impermeable to water.

SUMMARY OF THE INVENTION

Therefore, an object of the present invention is to provide a cost-effective method for preparing a polyurethane foam, which is low permeable to air and impermeable to water, using a specific polyol and foam stabilizer.

The inventors have found that by using a polyolefin polyol as the polyhydroxyl compound and a carboxy-, epoxy- or methacryl-modified organosilicone as the foam stabilizer, there is obtained a flexible or semi-hard polyurethane foam which is low permeable to air and impermeable to water. The use of such a silicone foam stabilizer, especially the carboxy-modified organosilicone, is also advantageous in that when a molding is expanded within a mold cavity, the stabilizer also helps the compound as injected smoothly spread in the mold cavity and is thus effective for preventing occurrence of voids and cracks. In the step of blowing a flexible block, the time from the start to the end of reaction is controllable so that a rise pattern is variable. This offers the additional advantage of easy shape control to a rectangular shape.

Accordingly, the present invention provides a method for preparing a flexible or semi-hard polyurethane foam from a blend containing a polyhydroxyl compound, an isocyanate, a blowing agent, a catalyst, and a foam stabilizer. The polyhydroxyl compound used herein is a polyolefin polyol. The foam stabilizer used herein is selected from the group consisting of a carboxy-modified organosilicone, an epoxy-modified organo-silicone, a methacryl-modified organosilicone, and mixtures thereof. The blend is caused to expand to produce a water-impermeable polyurethane foam.

DETAILED DESCRIPTION OF THE INVENTION

Figure 1:
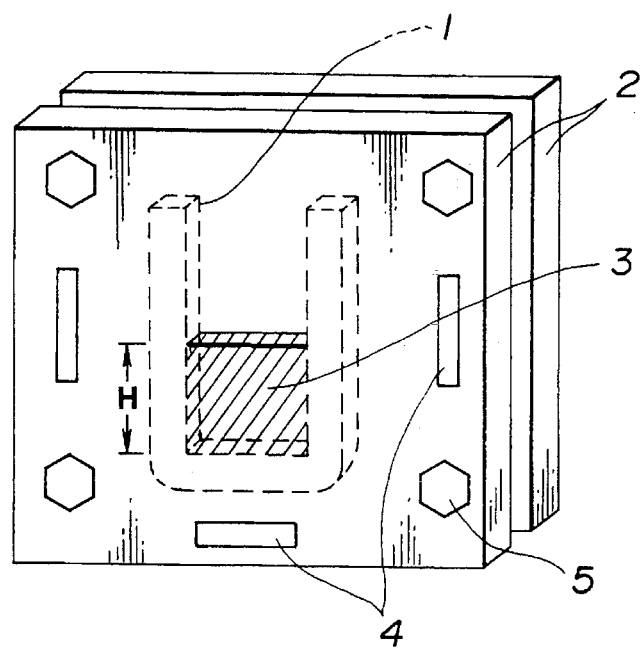
FIG. 1 is a perspective view of a water impermeability test assembly.

Flexible or semi-hard, open-cell polyurethane foams are prepared from a blend containing a polyhydroxyl compound or polyol, an isocyanate, a blowing agent, a catalyst, a foam stabilizer, and optional additives. According to the invention, a polyolefin polyol is used as the polyhydroxyl compound, and a carboxy-, epoxy- or methacryl-modified organosilicone is used as the foam stabilizer. The resulting polyurethane foam is water-impermeable.

The polyolefin polyol which can be used herein is preferably selected from hydrogenated products of polyisoprene, polybutadiene and analogues containing at least two hydroxyl groups in a molecule and having a molecular skeleton of a saturated hydrocarbon structure. Their number average molecular weight ranges from about 1,000 to about 5,000, especially from about 2,000 to about 4,000.

In addition to the polyolefin polyol, any of polyether polyols and polyester polyols conventionally used in the preparation of flexible or semi-hard polyurethane foams may be used insofar as the benefits of the invention are not lost. Preferably the polyolefin polyol is used in an amount of 20 to 100%, especially 50 to 100% by weight of the total weight of the polyhydroxyl compound or polyol.

The carboxy-modified organosilicone used herein is preferably selected from those of the following formulae (1) to (4).

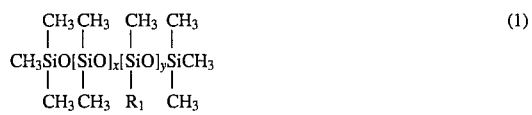

In formula (1), R is $C_nH_{2n}O(C_2H_4O)_a(C_3H_6O)_bC_{n'}H_{2n'}COOR'$ or $C_nH_{2n}O(C_2H_4O)_a(C_3H_6O)_bOC_{n'}H_{2n'}COOR'$ wherein R' is a hydrogen atom, an alkyl group having 1 to 5 carbon atoms, an aminocarbonylalkyl group having 1 to 5 carbon atoms, a halogenated carbonyl-alkyl group having 1 to 5 carbon atoms, an alkoxycarbonylalkyl group having 1 to 5 carbon atoms, or a salt thereof, n is 1 to 10, n' is 1 to 20, and each of a and b is 1 to 50, the ratio of a/b being from 3/1 to 1/3 in molar ratio;

letter x is a number of 1 to 300 and y is a number of 1 to 25.

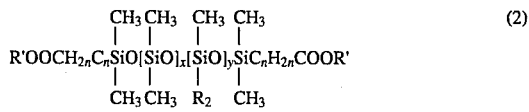

In formula (2), $R_2$ is $C_nH_{2n}O(C_2H_4O)_a(C_3H_6O)_bC_{n'}H_{2n'+1}$; and R', x, y, n, n', a and b are as defined above.

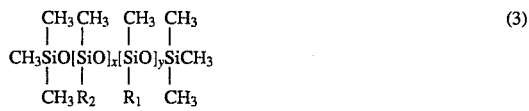

In formula (3), $R_1$, $R_2$, x and y are as defined above.

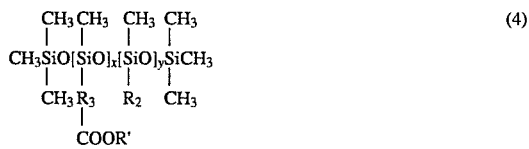

In formula (4), $R_3$ is $C_nH_{2n}$; and R', x and y are as defined above.

The epoxy-modified organosilicone used herein is preferably selected from those of the following formulae (5) to (7).

In formula (5), $R_1$ is $C_nH_{2n}O(C_2H_4O)_a(C_3H_6O)_bA$ wherein A is

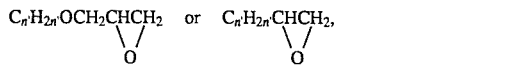

n is 1 to 10, n' is 1 to 20, and each of a and b is 1 to 50, the ratio of a/b being from 3/1 to 1/3 in molar ratio;

letter x is a number of 1 to 300 and y is a number of 1 to 25.

In formula (6), $R_2$ is $C_nH_{2n}O(C_2H_4O)_a(C_3H_6O)_bC_{n'}H_{2n'+1}$ or $C_nH_{2n}O(C_2H_4O)_a(C_3H_6O)_bOC_{n'}H_{2n'+1}$ wherein n, n', a, and b are as defined above; and A, x, and y are as defined above.

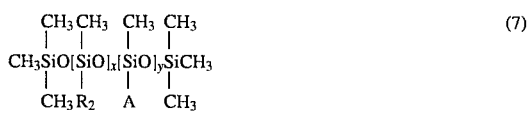

In formula (7), $R_2$, A, x and y are as defined above.

The methacryl-modified organosilicone used herein is preferably selected from those of the following formula (8).

In formula (8), $R_1$ is $C_nH_{2n}O(C_2H_4O)_a(C_3H_6O)_bB$ wherein B is $C_{n'}H_{2n'}OC(CH_3)=CH_2$, n is 1 to 10, n' is 1 to 20, and each of a and b is 1 to 50, the ratio of a/b being from 3/1 to 1/3 in molar ratio;

letter x is a number of 1 to 300 and y is a number of 1 to 25.

The silicone or foam stabilizer is preferably blended in an amount of about 0.3 to about 5 parts, more preferably about 0.5 to about 2.5 parts by weight per 100 parts by weight of the polyhydroxyl compound. If the silicone amount is less than 0.3 parts on this basis, it would be less effective for stabilizing cells. If the silicone amount is more than 5 parts, the resulting foam would have a considerable amount of closed cells, resulting in inferior foams.

The components other than the polyhydroxyl compound and the silicone or foam stabilizer are conventional ones commonly used in the preparation of flexible or semi-hard polyurethane foams.

More particularly, the isocyanates include tolylene diisocyanate (TDI), polymethylene polyethylene polydiisocyanate, hexamethylene diisocyanate, 1,5-naphthalene diisocyanate, xylylene diisocyanate, and isophorone diisocyanate, to name a few. The isocyanate is generally used in an amount of 20 to 75 parts by weight per 100 parts by weight of the polyhydroxyl compound, although the amount is not limited thereto.

Examples of the blowing agent include water and methylene chloride though it is not limited thereto.

The catalyst includes tertiary amines, tertiary amine complex salts, organic tin compounds, for example, triethylenediamine, triethylenediamine complex salts, triethylamine, bis(dimethylamino)ethyl ether, bis(dimethylamino)ethyl ether complex salts, N-methylmorpholine, stannous octylate, and stannic dibutyl laurate.

Other additives such as UV absorbers, anti-oxidants, and pigments are used if necessary.

The amounts of the blowing agent and catalyst are not particularly limited although it is preferred that the blowing agent is blended in an amount of 1 to 6 parts by weight and the catalyst is blended in an amount of 0.1 to 3 parts by weight, per 100 parts by weight of the polyhydroxyl compound.

According to the present invention, a flexible or semi-hard polyurethane foam is obtained by mixing the above-mentioned components into a blend and causing the blend to expand in a conventional manner.

In the expanding step, the carboxy-modified organosilicone reacts with the isocyanate to give off carbon dioxide gas according to the following reaction formulae, thus producing a foam having good outer appearance, low air permeability and water impermeability.

~NCO+HOOC~→~NHCOOCO~→~NHCO~+$CO_2$

~NCO+$H_2O$→~NHCOOH~→~$NH_2$+$CO_2$

~$NH_2$+R'OOC~→~NHCO~+R'OH

~NCO+R'OH→~NHCOOR'

Herein R' denotes a hydrogen atom, alkyl group or salt.

In the preparation of polyurethane foams, cells are generally created by utilizing as a cell nucleus carbon dioxide gas resulting from reaction between water and isocyanate. The density is determined by a blowing pressure. The carbon dioxide gas resulting from reaction between the carboxy-modified silicone and the isocyanate also participates in the process to serve as a cell nucleus. Then cells become fine and stable as compared with conventional alkyl-capped silicones. Also the foam density can be reduced by controlling the amount of the carboxy-modified silicone. Additionally, the carboxy-modified silicone acts as a catalyst for retarding the reaction.

Though not bound to the theory, it is believed that the carboxy-modified silicone act as a retarding catalyst because it first forms a salt with an amine catalyst as shown below and then reacts with the isocyanate.

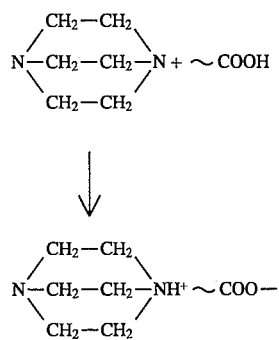

The epoxy-modified organosilicone requires some heat (about 100° C.) in the presence of alkali to open its ring as shown below.

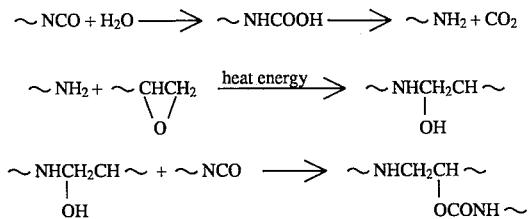

(Note: Instead of heat energy, an amine catalyst can trigger ring opening. The last-mentioned structure can further transfer to an allophanate linkage.)

Then the epoxy-modified organosilicone maintains foam stabilizing ability until an intermediate point during reaction, without undergoing ring opening. Just prior to the completion of reaction of the entire system, it opens its ring to participate in the reaction. Therefore, this foam stabilizer ensures preparation of a foam having good outer appearance, low air permeability and water impermeability without restraining expansion.

The methacryl-modified organosilicone reacts with other components in the overall reaction process as shown below and maintains its foam stabilizing ability to some extent and is eventually involved in the system through reaction, achieving low air permeability and water impermeability.

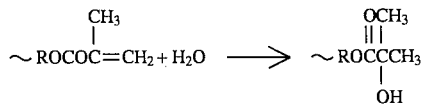

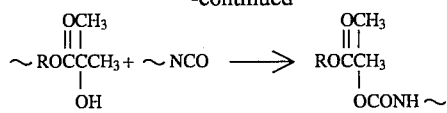

In the practice of the invention, blowing conditions may be properly determined without undue experimentation. Usually, a foaming time (rise time) is about 30 seconds to about 3 minutes.

It is to be noted that the reaction rate is generally controlled by amine catalysts although fine control is not expectable with amine-tin catalysts systems due to their enhanced activity.

Also the use of a carboxy-modified silicone as the foam stabilizer had the additional advantage that when a blend is expanded within a mold cavity, this stabilizer also helps the blend as injected smoothly spread in the mold cavity and is thus effective for preventing occurrence of voids and cracks. In the step of blowing a flexible block, the time from the start to the end of reaction is controllable so that a rise pattern is variable, which is advantageous for shape control, typically to a rectangular shape.

There has been described a method for preparing a flexible or semi-hard polyurethane foam having low air permeability and water impermeability by using a polyolefin polyol and a specific modified silicone.

EXAMPLE

Examples of the present invention are given below by way of illustration and not by way of limitation. All parts are by weight.

Figure 2:
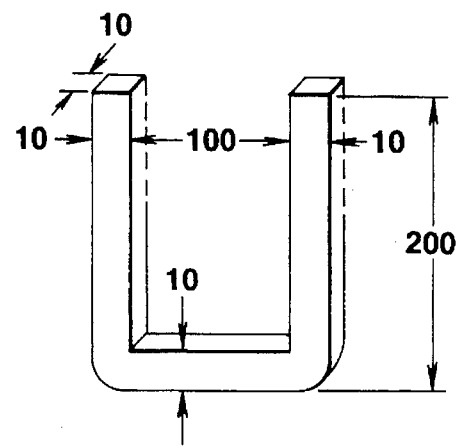
FIG. 2 is a perspective view of a foam sample used in the test assembly of FIG. 1.

Note that air permeability is evaluated in accordance with JIS L-1004 using a frazeal type and a foam of 10 mm thick. Water impermeability is evaluated by punching a foam block of 10 mm thick into a U-shaped sample 1 as shown in FIG. 2, sandwiching the U-shaped sample 1 between a pair of acryl plates 2, 2, torquing bolts 5 to clamp the plates together through spacers 4 to compress the sample by 50% to define an interior cavity as shown in FIG. 1, setting the assembly with the two legs of the U-shaped sample upright, pouring water 3 into the interior cavity to a height (or water column) H, and measuring a time of water leakage under the impetus of water pressure.

Example 1

A hydroxyl-terminated hydrogenated polyisoprene polyol having a hydroxyl number of 40 and a dimer acid polyester polyol having a hydroxyl number of 72 were blended in a weight ratio of 4:1. To 100 parts of the blend were added 2.0 parts of water, 30 parts of TDI 80, 0.3 parts of triethylenediamine and 0.5 parts of stannous octoate as catalysts, and 1 part of a carboxy-modified organosilicone of the following formula:

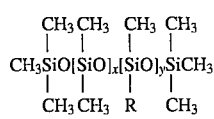

wherein R is $C_3H_6(C_2H_4O)_a(C_3H_6O)_bC_3H_6COOH$, the molar ratio of a/b is 50/50, x is 150, and y is 15 as a foam stabilizer. The resulting blend was expanded to produce a flexible polyurethane foam, the physical properties of which are shown in Table 1.

Comparative Examples 1–3

To 100 parts of a polyether polyol obtained by addition polymerization of propylene oxide to glycerin and having a molecular weight of 3,000 and a hydroxyl number of 56 were added 42.8 parts of TDI 80, 3.0 parts of water, 0.9 parts of tolylenediamine and 0.11 parts of stannous octoate as catalysts, and 1 part of the same carboxy-modified organo-silicone as used in Example 1 as a foam stabilizer. The resulting blend was expanded to produce a flexible polyurethane foam (Comparative Example 1).

Flexible polyurethane foams were produced by the same procedure as above except that an alkyl end-capped silicone and a hydroxyl-terminated silicone were used as the foam stabilizer (Comparative Examples 2 and 3).

The physical properties of these foams are also shown in Table 1.

TABLE 1

| Example | Density (g/cm$^3$) | Air permeability (cc/cm$^2$/sec) | Water impermeability at 50% compression (hour) | | |
|---|---|---|---|---|---|
| | | | H = 5 mm | H = 50 mm | H = 100 mm |
| E 1 | 0.0479 | <0.3 | >24 | >24 | >24 |
| CE 1 | 0.0315 | 12–3 1) | >24 | >24 | 5 |
| CE 2 | 0.0313 | 70–35 1) | immediately leaked | immediately leaked | immediately leaked |
| CE 3 2) | 0.0318 | 17–5 1) | >24 | >24 | 5 |

1) Upper and lower limits at a block height 50 mm
2) As density lowered, more voids developed in foams of Comparative Example 3 using a hydroxyl-terminated silicone, rendering it difficult to machine into a shape. This is probably because more water and isocyanate were required to provide a lower density with a likelihood that the terminal hydroxyl group would quickly react with the isocyanate to detract from the foam stabilizing ability.

Example 2 & Comparative Examples 4

Example 1 was repeated except that the amount of the silicone was changed to 1.0, 3.0 and 5.0 parts. Comparative Examples had the same composition as Example 1 except that the alkyl end-capped silicone was used as the foam stabilizer.

Figure 3:
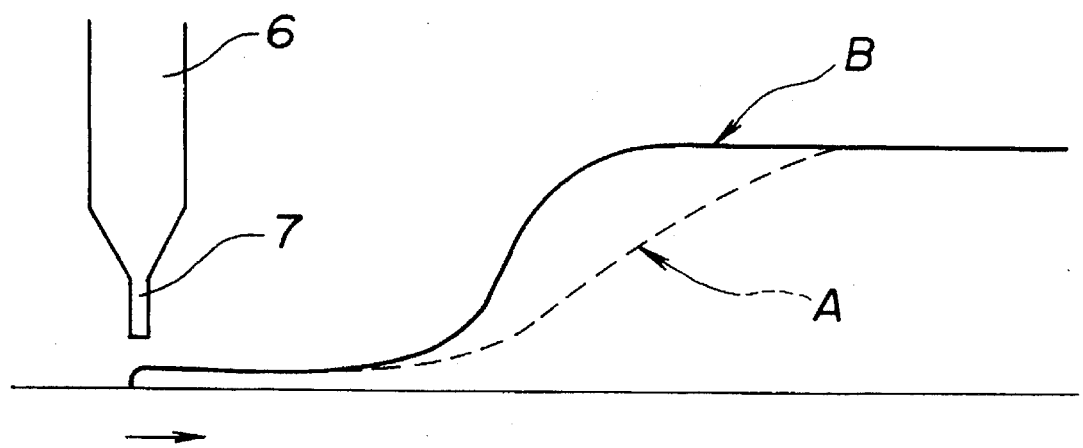
FIG. 3 schematically illustrates observation of expansion of a blend.

As shown in FIG. 3, the ingredients were mixed in a mixing head 6 and the blend was injected to a platform through a nozzle 7. While the blend was expanded, a cream time and a rise time were measured. The cream time is the time within which the blend as injected remains creamy and the rise time is a foaming time. The results are shown in Table 2 and depicted in FIG. 3 wherein curve A is Example 2 and curve B is Comparative Example 4.

TABLE 2

| Example | Silicone (parts) | Cream time | Rise time |
|---|---|---|---|
| E 2 | 1.0 | 5–7 sec. | 55–57 sec. |
| CE 4 | 1.0 | 3–5 sec. | 50–51 sec. |
| E 2 | 3.0 | 8–10 sec. | 60–62 sec. |
| CE 4 | 3.0 | 3–5 sec. | 50–51 sec. |
| E 2 | 5.0 | 12–14 sec. | 64–66 sec. |
| CE 4 | 5.0 | 3–sec. | 48–49 sec. |

As seen from Table 2 and FIG. 3, the silicone used in Comparative Example 4 has the tendency that when their amount is increased, they promote reaction slightly, but not outstandingly as in the present invention. In contrast, the carboxy-modified silicone apparently slows down reaction. Therefore, in a conventional method (Comparative Examples), where expansion is done on a manufacture line, the reaction zone can be clogged because of rapid expansion, resulting in cracks. If it is desired to obtain a rectangular shape by pulling a side with a film, handling is quite difficult. In contrast, the present invention facilitates operation to form a rectangular shape since the reaction is moderate.

Example 3

Example 1 was repeated except that an epoxy-modified silicone shown below was used as the foam stabilizer. The foam had the physical properties shown in Table 3.

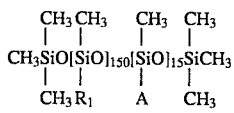

In the formula, A is

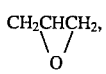

$R_1$ is $C_3H_6O(C_2H_4O)_a(C_3H_6O)_bC_4H_9$, and the ratio of a/b is 50/50.

Example 4

Example 1 was repeated except that a methacryl-modified silicone shown below was used as the foam stabilizer. The foam had the physical properties shown in Table 3.

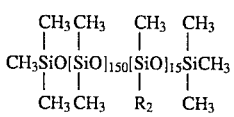

In the formula, $R_2$ is $C_3H_6O(C_2H_4O)_a(C_3H_6O)_bC_2H_4OC(CH_3)=CH_2$, and the ratio of a/b is 50/50.

TABLE 3

| Example | Density (g/cm³) | Air-permeability (cc/cm²/sec) | Water impermeability at 50% compression (hour) H = 50 mm |
|---|---|---|---|
| E 3 | 0.0468 | less than 1.0 | >24 hr. |
| E 4 | 0.0480 | less than 1.0 | >24 hr. |

Japanese Patent Application No. 5-226696 is incorporated herein by reference.

Although some preferred embodiments have been described, many modifications and variations may be made thereto in the light of the above teachings. It is therefore to be understood that within the scope of the appended claims, the invention may be practiced otherwise than as specifically described.

We claim:

1. A method for preparing a flexible or semi-hard polyurethane foam from a blend containing a polyhydroxyl compound, an isocyanate, a blowing agent, a catalyst, and a foam stabilizer, characterized in that a polyolefin polyol is used as the polyhydroxyl compound, and at least one member selected from the group consisting of a carboxy-modified organosilicone, an epoxy-modified organosilicone, and a methacryl-modified organosilicone is used as the foam stabilizer, whereby a water-impermeable polyurethane foam is obtained.

2. The method of claim 1 wherein about 0.3 to 5 parts by weight of the foam stabilizer is used per 100 parts by weight of the polyhydroxyl compound.

* * * * *